US010946978B1

(12) United States Patent
Lunin

(10) Patent No.: US 10,946,978 B1
(45) Date of Patent: Mar. 16, 2021

(54) SYSTEMS AND METHODS FOR CONDUCTIVE AIRCRAFT SENSORS

(71) Applicant: Rockwell Collins, Inc., Cedar Rapids, IA (US)

(72) Inventor: Stepan V. Lunin, Irvine, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 428 days.

(21) Appl. No.: 15/256,311

(22) Filed: Sep. 2, 2016

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 5,184,516 A * | 2/1993 | Blazic | ...................... | G01B 7/16 73/799 |
| 9,068,283 B2 * | 6/2015 | Biris | ........................ | D01F 9/127 |
| 2013/0111994 A1 * | 5/2013 | Khandani | ........... | G01M 5/0008 73/587 |

FOREIGN PATENT DOCUMENTS

| | | | | |
|---|---|---|---|---|
| EP | 1944095 A2 * | 7/2008 | ........... | B06B 1/0622 |
| EP | 2894451 B1 * | 1/2018 | ............. | B64D 45/00 |
| WO | WO-2011002689 A1 * | 1/2011 | .......... | G01M 5/0033 |

OTHER PUBLICATIONS

Nisha et al. 2016 Int. J. Vehicle Structures & Systems, 8(2), 74-81 ISSN: 0975-3060 (Print(, 0975-3540 (online) @2016. MechAero Foundation for Technical Research & Educational Excellance (Year: 2016).*

* cited by examiner

*Primary Examiner* — Curtis A Kuntz
*Assistant Examiner* — Shawna M Kingston
(74) *Attorney, Agent, or Firm* — Suiter Swantz pc llo

(57) ABSTRACT

An airborne platform includes a body and a sensor device. The body includes a first material having a first flexibility. The sensor device is positioned inside the body, and includes an electric conductor. The electric conductor includes a second material that has a second flexibility that is less than the first flexibility. The sensor device is configured to output an output signal indicating whether the sensor device has undergone mechanical failure in response to a load applied to the sensor device that is greater than a load threshold.

19 Claims, 7 Drawing Sheets

SYSTEMS AND METHODS FOR CONDUCTIVE AIRCRAFT SENSORS

BACKGROUND

The inventive concepts disclosed herein relate generally to the field of aircraft sensors. More particularly, embodiments of the inventive concepts disclosed herein relate to actively monitored electric conductors. Sensors on aircraft can be used to detect whether certain components are undergoing external stresses that can lead to component damage or failure. This information can be used to guide a health monitoring system that tracks health of components of the aircraft, or to perform repairs or maintenance, such as to identify a part that needs replacement. However, it is difficult to provide aircraft with sensors that detect external stresses with high accuracy and high precision. Sensors may be required to be placed on an external surface of the aircraft, and fixed to the aircraft using an adhesive, which may change the position of the sensor as heat or other external conditions cause the adhesive to change in material properties. Sensors which are placed on an external surface of the aircraft cannot directly detect the effect of external loads on points within structures of the aircraft (e.g., within an aluminum wing of the aircraft), requiring the effect on the points within the structures to be estimated by interpolating load values detected outside the aircraft.

SUMMARY

In one aspect, the inventive concepts disclosed herein are directed to an airborne platform. The airborne platform includes a body and a sensor device. The body includes a first material having a first flexibility. The sensor device is positioned inside the body, and includes an electric conductor. The electric conductor includes a second material that has a second flexibility that is less than the first flexibility. The sensor device is configured to output an output signal indicating whether the sensor device has undergone mechanical failure in response to a load applied to the sensor device that is greater than a load threshold.

In a further aspect, the inventive concepts disclosed herein are directed to a method. The method includes fabricating a first portion of a body of an airborne platform using a composite material. The composite material has a first flexibility. The method includes impregnating a sensor device on the first portion. The sensor device includes an electric conductor including a second material that has a second flexibility that is less than the first flexibility. The method includes fabricating a second portion of the body of the airborne platform on the first portion and the sensor device using the composite material, such that the sensor device is located inside the body. The method includes receiving a load at the sensor device. The method includes outputting an output signal indicating whether the sensor device has undergone mechanical failure based on whether the received load is greater than a load threshold.

In a further aspect, the inventive concepts disclosed herein are directed to a sensor device. The sensor device includes an electric conductor that includes a first material having a first flexibility. The sensor device is configured to output an output signal indicating whether the sensor device has undergone mechanical failure in response to a load applied to the sensor device that is greater than a load threshold. The first material is selected based on an expected load applied to a body of an airborne platform in which the sensor device is impregnated. The body has a second flexibility that is greater than the first flexibility.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
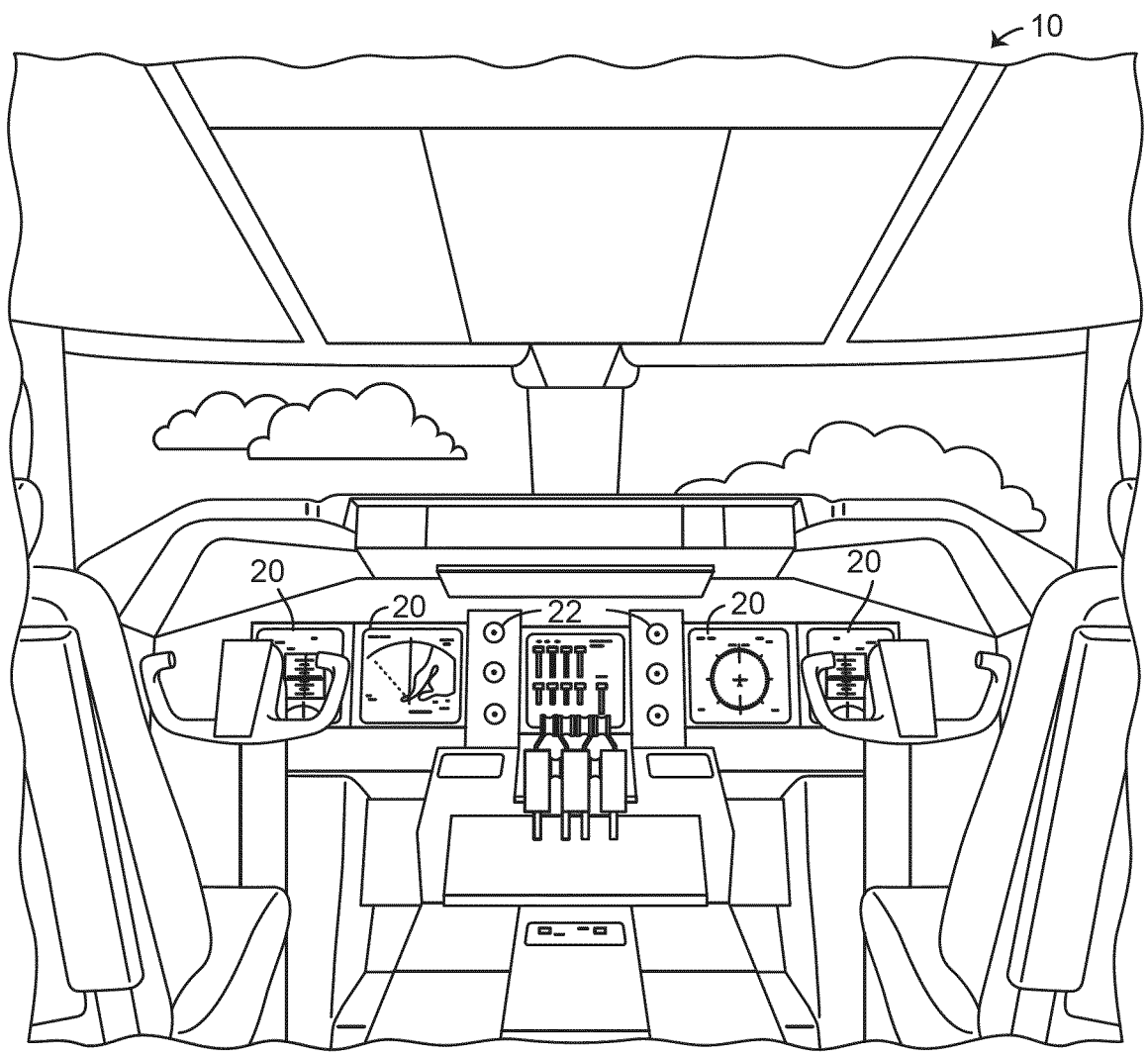
FIG. 1 is a perspective view of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for conductive airborne platform sensors, such as sensors including a conductive material embedded in a composite structure of an airborne platform. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system).

In some embodiments, an airborne platform includes a body and a sensor device positioned inside the body. The body includes a first material having a first flexibility. The sensor device includes an electric conductor. The electric conductor includes a second material that has a second flexibility that is less than the first flexibility. The sensor device is configured to output an output signal indicating whether the sensor device has undergone mechanical failure in response to a load applied to the sensor device that is greater than a load threshold. For example, a load applied to the sensor device that is greater than a load threshold can cause mechanical or electrical failure of the electric conductor (e.g., causes the electric conductor to break), and the sensor device can output the output signal to indicate this failure. Unlike existing solutions, in which sensors devices are required to be placed on an exterior surface of the body (e.g., sensors cannot be placed within metal alloy body structures), systems manufactured in accordance with the present disclosure, having a sensor device embedded in (e.g., integrated in, manufactured between layers of) a composite material-based body structure, allow the sensor device to provide an indication of loads and mechanical failures at a precise location within the body structure because one or more signals from externally located sensors do not have to be interpolated to estimate a load within the body structure. In addition, unlike existing solutions that use externally located sensors, composite material-based sensors embedded in a composite material-based body structure are not required to be pre-stretched or pre-loaded to function as sensors.

Referring to FIG. 1, a perspective view schematic illustration of an aircraft control center or cockpit 10 of an airborne platform is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data, such as a structural failure or possible structural failure of a body structure of the airborne platform.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may be configured to output an indication of a mechanical failure or a potential mechanical failure of a body structure of the airborne platform based on information received from a sensor device embedded in the body structure (e.g., a failure due to a load applied to the body structure).

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. Other UI elements 22, such as indicator lights, displays, display elements, and audio alerting devices, may be configured to warn of potentially threatening conditions such as severe weather, terrain, obstacles, such as potential collisions with other aircraft, and damage or potential damage to the airborne platform (e.g., damage detected by a sensor device embedded in a body structure of the airborne platform).

Figure 2A:
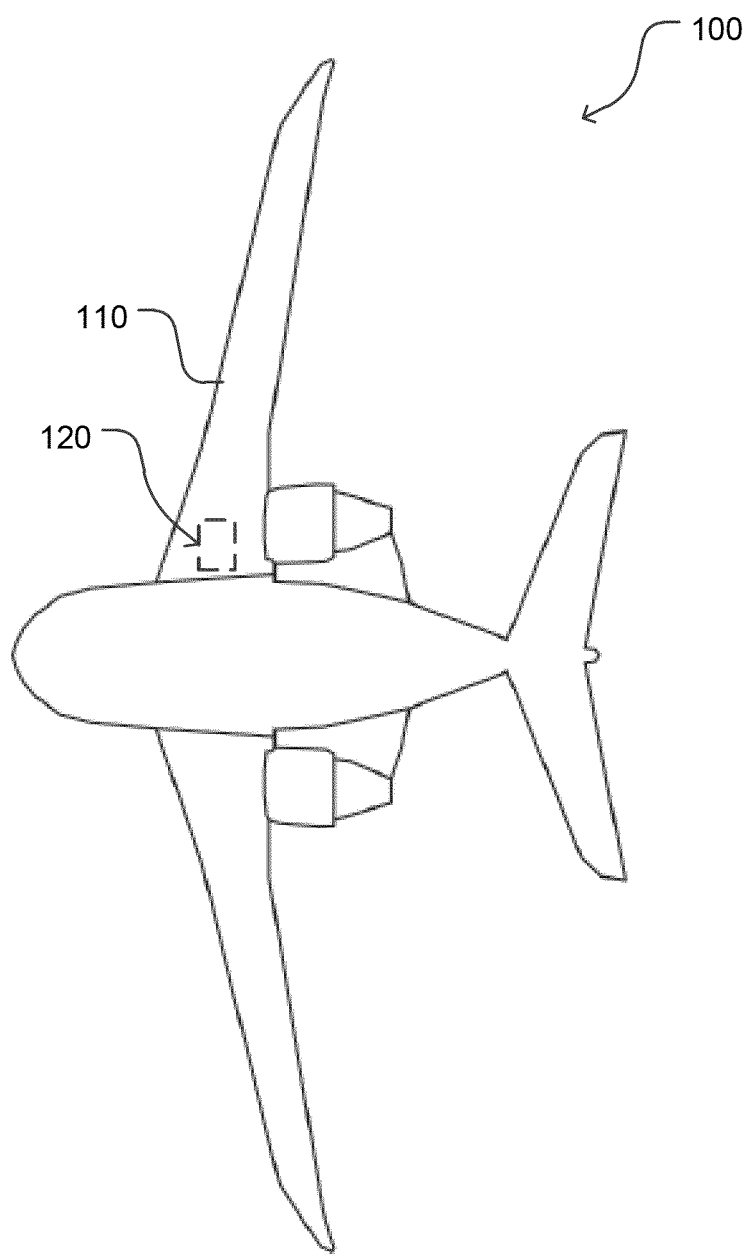
FIG. 2A is a schematic illustration of an exemplary embodiment of an airborne platform according to the inventive concepts disclosed herein.
Figure 2B:
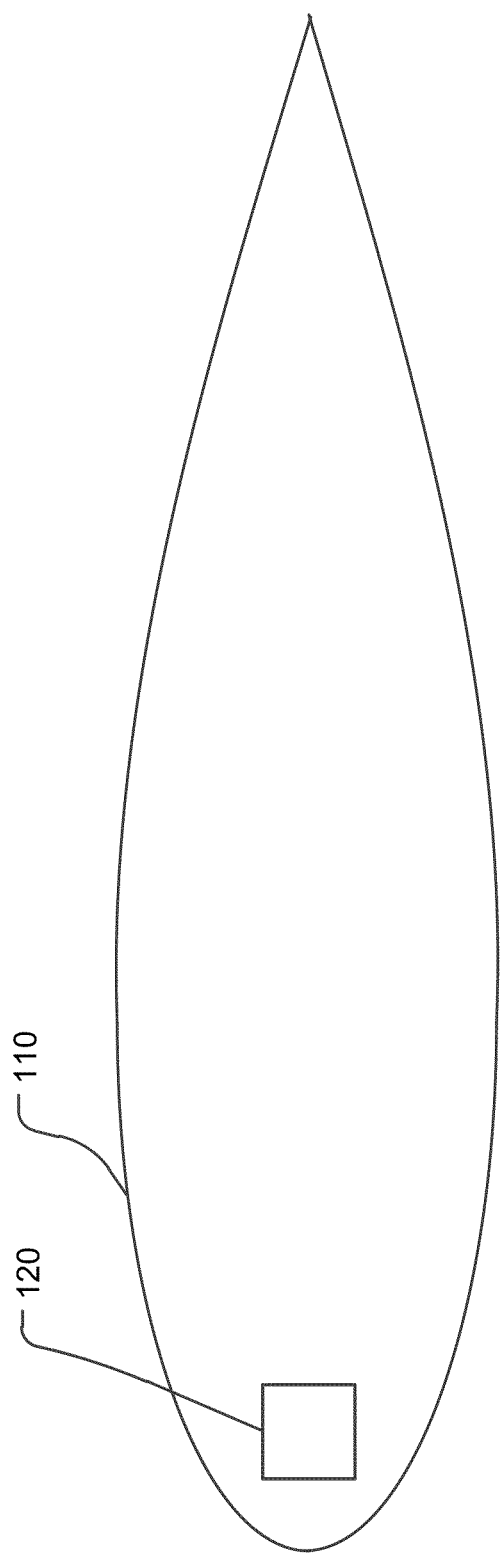
FIG. 2B is a schematic illustration of an exemplary embodiment of a body structure of the airborne platform of FIG. 2A according to the inventive concepts disclosed herein.

Referring now to FIG. 2, an airborne platform 100 is shown according to the inventive concepts disclosed herein. The airborne platform 100 includes a body 110. As illustrated in FIG. 2, the body 110 is a wing of the airborne platform 100; in various embodiments, the body 110 can be or include various components of an airborne platform 100 (e.g., fuselage, tail, turbine).

In some embodiments, the body 110 has or defines a material property representing a response of the body 110 to a load. For example, the material property can be a flexibility of the body 110, or an elongation of the body 110. The response of the body 110 can be a mechanical change in shape, such as stretching, bending, compressing, elongating, or breaking. In some embodiments, a material of the body is a composite material.

In some embodiments, the airborne platform 100 includes a sensor device 120. The sensor device 120 is configured detect a load applied to the airborne platform 100 and to output an indication of the load. For example, during flight, loads applied to the body 110 (e.g., a wing) due to a pressure differential on the wing can be detected by the sensor device 120. Similarly, during takeoff or landing, loads applied to the body 110 due to relatively large changes in velocity of the airborne platform 100 can be detected by the sensor device 120. Unlike existing sensor devices for aircraft, the sensor device 120 is integrated into the structure of the body 100, allowing for loads to be directly detected at locations within the body 100, rather than interpolated using data from one or more sensors located on an external surface of the body 100.

In some embodiments, the sensor device 120 includes an electric conductor (e.g., a material that is electrically conductive). Similar to the body 110, the electric conductor can include a material that has a material property representing a response of electric conductor to a load. The material property can be a flexibility (or a property that defines or relates to flexibility, such as stiffness, Young's modulus).

In some embodiments, the materials of the body 110 and/or the sensor device 120 include composite materials. In some embodiments, the materials of the body 110 and/or the sensor device 120 include structural fibers, such as carbon fibers or boron fibers.

The sensor device 120 can include a circuit to which the electric conductor is connected, such that if the electric conductor is damaged and ceases to conduct electricity, the circuit will be broken. In some embodiments, the sensor device 120 is configured to receive an electrical signal outputted by the electric conductor circuit, and output an output signal indicating that the electric conductor has undergone mechanical failure when the electrical signal is not output by the electric conductor circuit (or in response to determining that the electrical signal is not being outputted by the electric conductor circuit). In some embodiments, the sensor device 120 only outputs an output signal when the electric conductor has undergone mechanical failure (e.g., only outputs an output signal in response to determining that the electrical signal is not being outputted by the electric conductor circuit).

In some embodiments, the output signal outputted by the sensor device 120 indicates mechanical failure by outputting an electrical signal having a particular property (e.g., current, voltage, frequency, phase), such that an end device receiving the output signal can process the electrical signal to determine whether mechanical failure has occurred. For example, the sensor device 120 can configure the output signal at a first voltage (or other property) to indicate that the sensor device 120 (or the electrical conductor thereof) is operating under normal conditions, and at a second voltage to indicate that the sensor device 120 (or the electrical conductor thereof) has undergone mechanical failure. In some embodiments, the sensor device 120 is configured to output the output signal at a voltage that is a function of or proportional to the load (e.g., if a resistance of the electric conductor changes based on the load). The end device may subsequently receive the output signal and process the output signal to determine whether mechanical failure has occurred and/or determine the load applied to the sensor device 120. In some embodiments, the end device is a diagnostic tool (e.g., a tool operated by a service or mechanical technician) connected to the sensor device 120 (e.g., via a wired or wireless connection), such as during a diagnostic test of the airborne platform 100. In some embodiments, the end device includes or is part of one or more components of the aircraft control center 10 (e.g., includes or is connected to the flight displays 20 or UI elements 22), such that a representation of the output signal can be outputted to a user of the aircraft control center. For example, the flight displays 20 can output an indication of whether the sensor device 120 has undergone mechanical failure based on the output signal received from the sensor device 120. The aircraft control center 10 can thus provide a real-time indication of the status of the sensor device 120, and thus of the body 100 in which the sensor device 120 is embedded.

In some embodiments, the sensor device 120 is configured to output an output signal indicating whether the sensor device 120 has undergone a failure event. The failure event can be a mechanical failure or an electrical failure. The sensor device 120 can output the output signal in response to a load applied to the sensor device 120 that is greater than a load threshold.

The load threshold can be defined based on at least one of a material of the sensor device 120 or an orientation of the sensor device 120 relative to the body 110 (see discussion of orientation with respect to FIG. 3B below). For example, varying materials may have varying mechanical responses to applied loads. The material may have a predetermined or expected response to a load. The material may have a predetermined or expected response profile or function (e.g., a load of 'x' can cause a response of 'y,' etc.). In some embodiments, the sensor device 120 is at least one of positioned or oriented such that the load threshold is less than a failure threshold at which the body 110 breaks.

In some embodiments, the load threshold corresponds to a mechanical or electrical response of the sensor device 120 to a load. For example, the load threshold can be a load at which a material of the sensor device 120 breaks or is unable to conduct electricity when the load is applied to the material. The sensor device 120 can output an output signal indicating the load applied to the material is greater than the load threshold based on the load causing the material to undergo failure.

The material can be selected based on its response to a load, and/or based on a relationship between the response of the material (of the sensor device 120) relative to a response of a material of the body 110. For example, the material can be selected such that a first load threshold above which the material undergoes failure is less than a corresponding second load threshold of a material of the body 110. The first load threshold may be a fraction of the second load threshold or may be less than the second load threshold by a tolerance (e.g., the fraction is proportion of 75 percent, 80 percent, 85 percent, 90 percent, 95 percent, 99 percent, 99.9 percent, or any other proportion greater than or equal to 75 percent and less than 100 percent). The relationship between the first load threshold and the second load threshold can be determined based on an intended application of the sensor device 120. For example, if the sensor device 120 is intended to provide advanced warning of potential mechanical failure (e.g., provide a real-time and/or in-flight warning), the fraction can be relatively small, allowing a user receiving the output signal indicating mechanical failure to perform a corrective action (e.g., corrective maneuver) to prevent the mechanical failure. If the sensor device 120 is intended to provide a relatively accurate representation of a load experienced at a location within the body 110, the fraction can be relatively large such that the sensor device 120 outputs an indication of a failure just before a slightly greater load would cause failure for the body 110 itself.

In some embodiments, the materials of the body 110 include fiberglass (e.g., wound fiberglass) having a first elongation (or other material property), and the materials of the sensor device 120 include an aluminum-based electric conductor (e.g., fuse) having a second elongation (or other material property) that is less than the first elongation, such that the aluminum-based electric conductor fails at a lower load than the body 110 itself, which can provide a warning of structural failure before the structural failure occurs.

The material of the sensor device 120 can be selected based on an expected load applied to the body 110 in which the sensor device 120 is impregnated or embedded. In some embodiments, the body 110 (or a material thereof) has a second flexibility that is greater than a first flexibility of the material of the sensor device 120. For example, if during operation of the airborne platform 100, a known or expected load (or range of loads) is applied to the body 110, the material of the sensor device 120 can be selected such that a failure indication from the sensor device 120 will be triggered at a lower load than a load causing failure of the body 110.

In some embodiments, the sensor device 120 is configured to be in a first state when exposed to a load less than or equal to the load threshold, and a second state when exposed to a load greater than the load threshold. For example, in the first state, the electric conductor of the sensor device 120 may be intact or otherwise able to conduct electricity, whereas in the second state, the electric conductor of the sensor device 120 may be broken or otherwise unable to conduct electricity. In some embodiments, a transition from the first state to the second state may be irreversible. In some embodiments, the sensor device 120 is configured to output an output signal of a first magnitude (or frequency, or other detectable representation of a property of the signal) when the sensor device 120 is in the first state, and output an output signal of a second magnitude (or frequency, or other detectable representation of a property of the signal) when the sensor device 120 is in the second state. For example, the electric conductor may be configured to exist in two different conformations or configurations separated by the load threshold, such that a current or voltage passing through the electric conductor may have two distinct values depending on whether the load applied to the sensor device 120 is greater than or less than the load threshold.

In some embodiments, the sensor device 120 (or the electric conductor thereof) is configured to undergo an irreversible transition from the first state to the second state in response to a load applied that is greater than the load threshold. For example, the applied load can cause an irreversible mechanical failure (e.g., breakage of the electric conductor) such that even when the load is no longer applied to the sensor device 120, the electric conductor remains broken or otherwise cannot conduct electricity. Based on a known load threshold at which the sensor device 120 (or the electric conductor thereof) transitions to the second state (e.g., a broken state), the load applied to the sensor device 120 can be determined. For example, if the sensor device 120 is configured to undergo mechanical failure at a load threshold of 1000 [$kg/m^2$], then when the sensor device 120 outputs the output signal in response to determining that the load threshold has been exceeded, the output signal will indicate that the applied load at the time of failure was 1000 [$kg/m^2$].

In some embodiments, the sensor device 120 (or the electric conductor thereof) is configured to undergo a reversible transition from the first state to the second state in response to a load applied that is greater than the load threshold. For example, in the second state, the electric conductor can be in a modified configuration relative to the first state, such that the electric conductor does not conduct electricity or conducts electricity at a different rate (e.g., different voltage, current, or other property of an electrical signal).

In some embodiments, the sensor device 120 (or the electric conductor thereof) is configured to undergo a number of reversible transition cycles between the first state and the second state, the number of reversible transition cycles based on at least one of a duration of the load or an amount by which the load exceeds the load threshold. As an illustrative example, the sensor device 120 may be configured to transition between the first state and the second state 1000 times in response to applied loads that are applied, on average, for 1 second; or transition 100 times in response to applied loads that are applied, on average, for 10 seconds.

In some embodiments, the output signal indicates a load applied to the body 110 where the sensor device 120 is located within the body 110. For example, the output signal can indicate the load applied at the location of the sensor device 120. In some embodiments, by embedding the sensor device 120 in the body 110, the load applied to the body 110 at the location of the sensor device 120 does not have to be determined using interpolation or using data acquired from locations other than the location of the sensor device 120 (e.g., data acquired from sensors external to the body 110). In some embodiments, the sensor device 120 is embedded at a critical location in the airborne platform 100, such as a location of maximum stress (e.g., a junction between distinct body structures 110).

In some embodiments, the output signal is converted to a measure of load by a calibration function that is independent of the location of the sensor device 120. For example, the sensor device 120 (or an analogous test version of the sensor device 120) can be calibrated to output an output signal using a calibration function that does not use the location of the sensor device 120 as an input, or that uses an electrical signal from the electric conductor but not the position of the electric conductor as an input, or that uses the electrical signal and an orientation of the electric conductor but not the position of the electric conductor as inputs. In other words, systems manufactured in accordance with the inventive concepts disclosed herein need not interpolate load values detected from externally placed sensors in order to estimate a load within the body 110; instead, the output signal outputted by the sensor device 120 itself is a measure of the load at the location of the sensor device 120.

In some embodiments, the load threshold corresponds to an expected response of the sensor device 120 to a load. For example, prior to operation of the sensor device 120, the sensor device 120 (or a test sample of the sensor device 120) can be calibrated by applying various loads to the sensor device 120 and identifying a load at which the sensor device 120 undergoes failure.

Figure 3A:
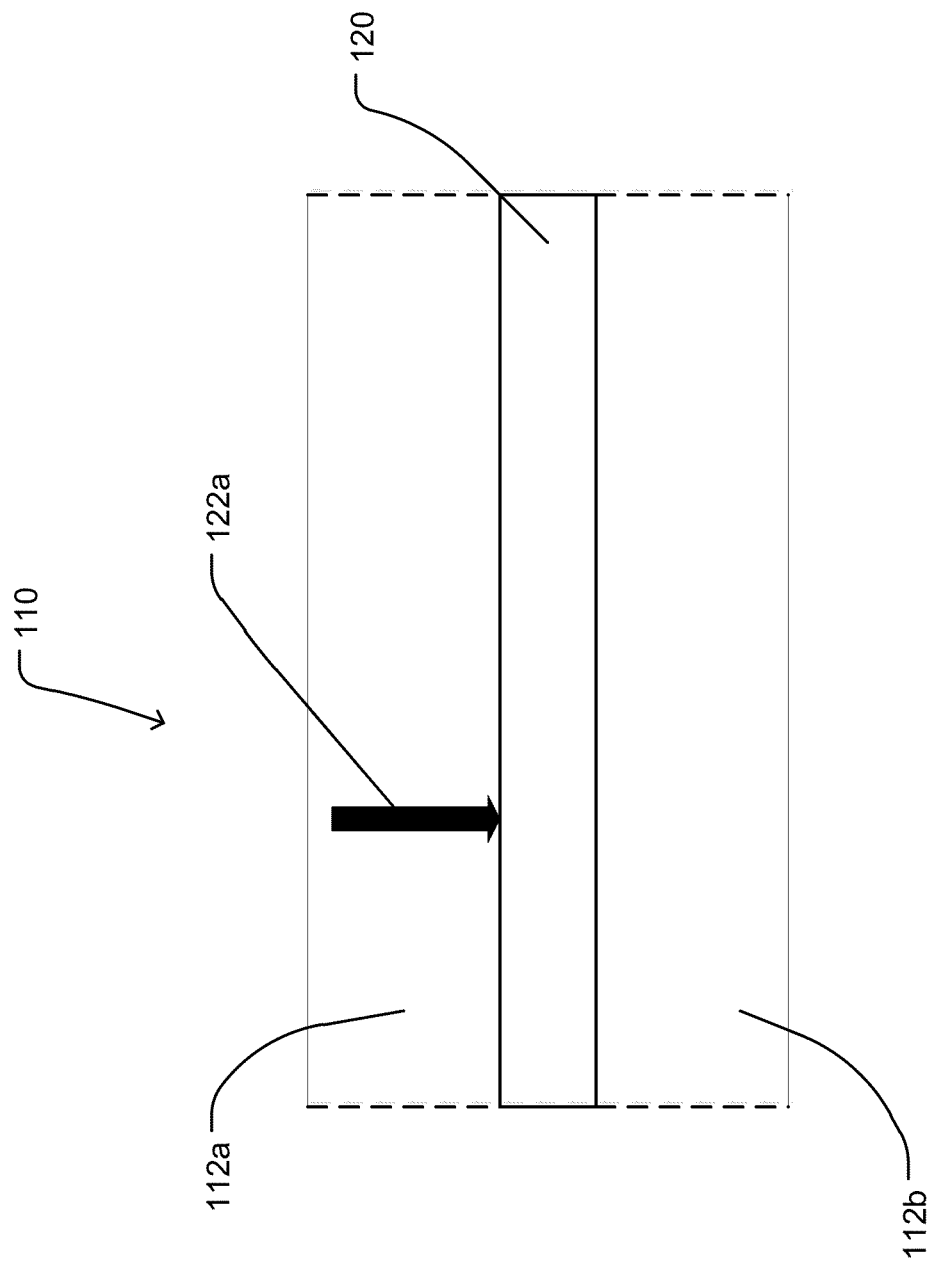
FIG. 3A is a diagram of an exemplary embodiment of a sensor device embedded in the body structure of FIG. 2B according to the inventive concepts disclosed herein.
Figure 3B:
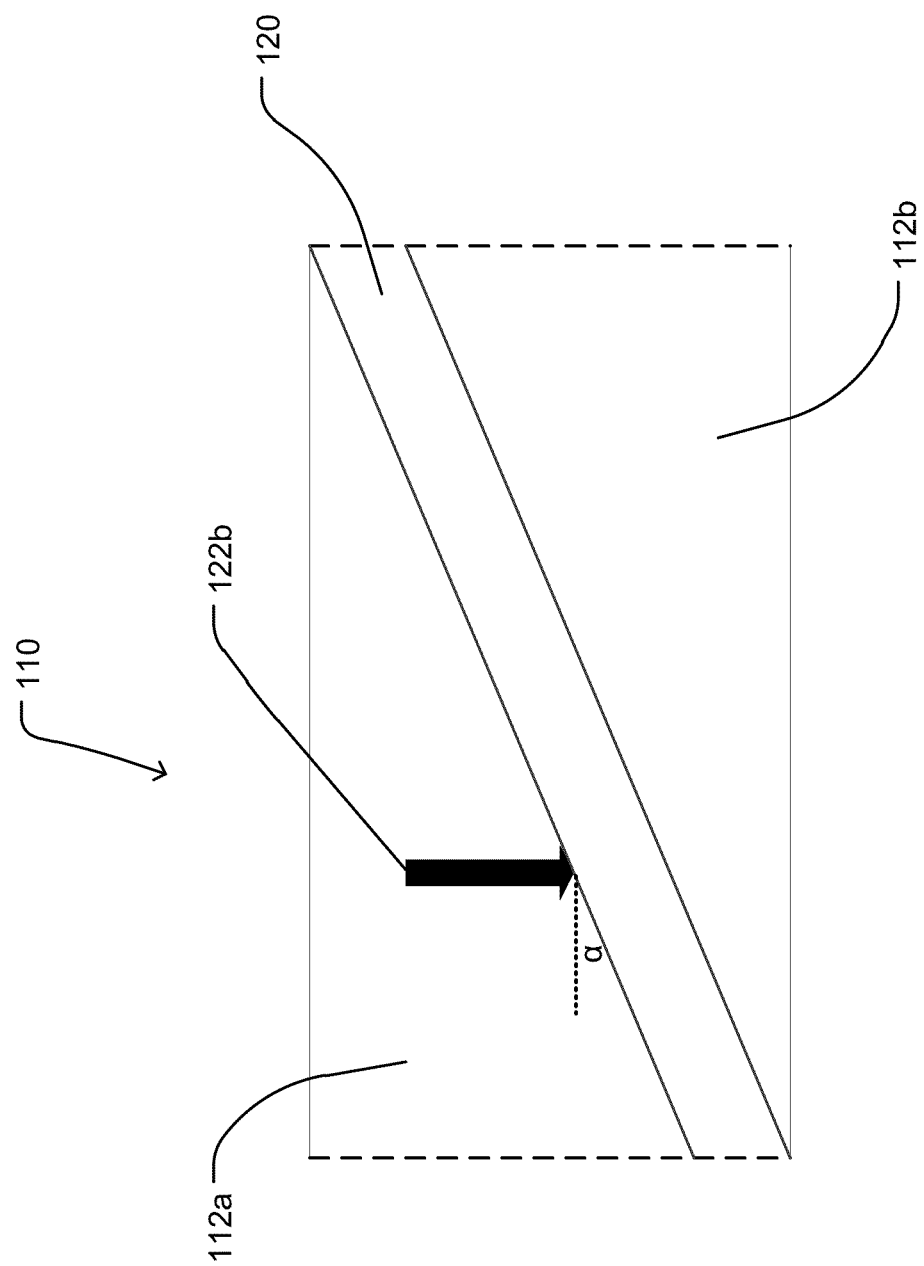
FIG. 3B is a diagram of an exemplary embodiment of the sensor device oriented at an angle when embedded in the body structure of FIG. 2B according to the inventive concepts disclosed herein.

Referring now to FIGS. 3A-3B, exemplary embodiments of various configurations of sensors devices 120 are shown according to the inventive concepts disclosed herein. As shown in FIG. 3A, the body 110 includes a first body portion 112a and a second body portion 112b. The sensor device 120 is positioned between the first body portion 112a and the second body portion 112b. For example, the sensor device 120 can be embedded in the body 110, such as during a deposition process (e.g., additive layer deposition). The first body portion 112a and second body portion 112b can be made from a composite material, such as fiberglass (or fiberglass fibers). Unlike existing solutions (e.g., body parts of an aircraft that use metal alloys), the use of the composite material can allow the sensor device 120 to be integrated in the body 110 without significantly reducing structural integrity of the body 110.

As shown in FIG. 3A, a load 122a (e.g., a load resulting from a pressure differential across the body 110, or vibrations in the airborne platform 100) is applied to the sensor device 120. The sensor device 120 can respond to the load 122a. For example, the sensor device 120 (or an electric conductor thereof) can be compressed or elongated by the load 122a. In some embodiments, the electric conductor of the sensor device 120 changes states based on the applied load 122a, or undergoes mechanical failure (e.g., breaks) due to the load 122a, such that an electrical signal detected by the sensor device 120 is modified, and in response, a modified output signal indicating the mechanical failure is outputted (e.g., if the electric conductor undergoes mechanical failure, then the sensor device 120 may detect that the electric signal is discontinued, and output an indication of the mechanical failure based on this discontinued signal).

As shown in FIG. 3B, in some embodiments, the sensor device 120 (or the electric conductor thereof) can be oriented at an angle relative to a direction at which a load 122b is received (e.g., illustrative angle a showing a rotational shift of the sensor device 120 relative to an angle at which the load 122b would be received normal to the sensor device 120). The sensor device 120 is positioned between the first body portion 112a and the second body portion 112b of the body 110. A force applied to the sensor device 120 based on the load 122b will thus be altered due to the angle $\alpha$. Specifically, the load received by the sensor device 120 will be the applied load 122b multiplied by an angle factor $\cos(\alpha)$. In some embodiments, the orientation of the sensor device 120 can be selected based on an expected load to be applied to the body 110 that includes the sensor device 120. Because the load received by the sensor device 120 is multiplied by the angle factor $\cos(\alpha)$, the same sensor device 120 (having a known set of material properties/responses to applied loads) can be positioned and oriented in different configurations throughout the airborne platform 100. For example, if the body 110 is expected to receive loads in a first range, and the sensor device 120 is configured to detect loads in a second range that does not overlap the first range (e.g., all (or at least some) values in the first range are greater than all values in the second range such that the sensor device 120 will not be able to resolve at least some loads in the first range), the sensor device 120 can be oriented at an angle $\alpha$ that enables the sensor device 120 to detect all (or a greater number of) loads in the first range (while maintaining the load threshold at which the sensor device 120 undergoes mechanical failure below a load threshold of the body 110).

In some embodiments, a plurality of sensor devices 120 can be embedded in one or more bodies 110 of the airborne platform 100. Multiple sensor device 120 can be embedded in the same body 110 at different positions and/or orientations, allowing for accurately monitoring loads in distinct or key locations.

In some embodiments, a plurality of heterogeneous sensor devices 120 can be embedded in relative proximity to one another to provide a graduated indication of load. For example, the sensor devices 120 may be constructed from identical materials and configured to provide a binary indication of load (e.g., output a first output signal when an applied load is less than or equal to a load threshold, and a second output signal different from the first output signal when the applied load is greater than the load threshold), but oriented at different orientations, such that the sensor devices 120 will have heterogeneous responses to applied loads by outputting an indicating of mechanical failure at different applied loads. In another example, the sensor devices 120 may be constructed from heterogeneous materials having heterogeneous responses to applied loads, such that the sensor devices 120 will output indications of mechanical failure at different applied loads.

Figure 3C:
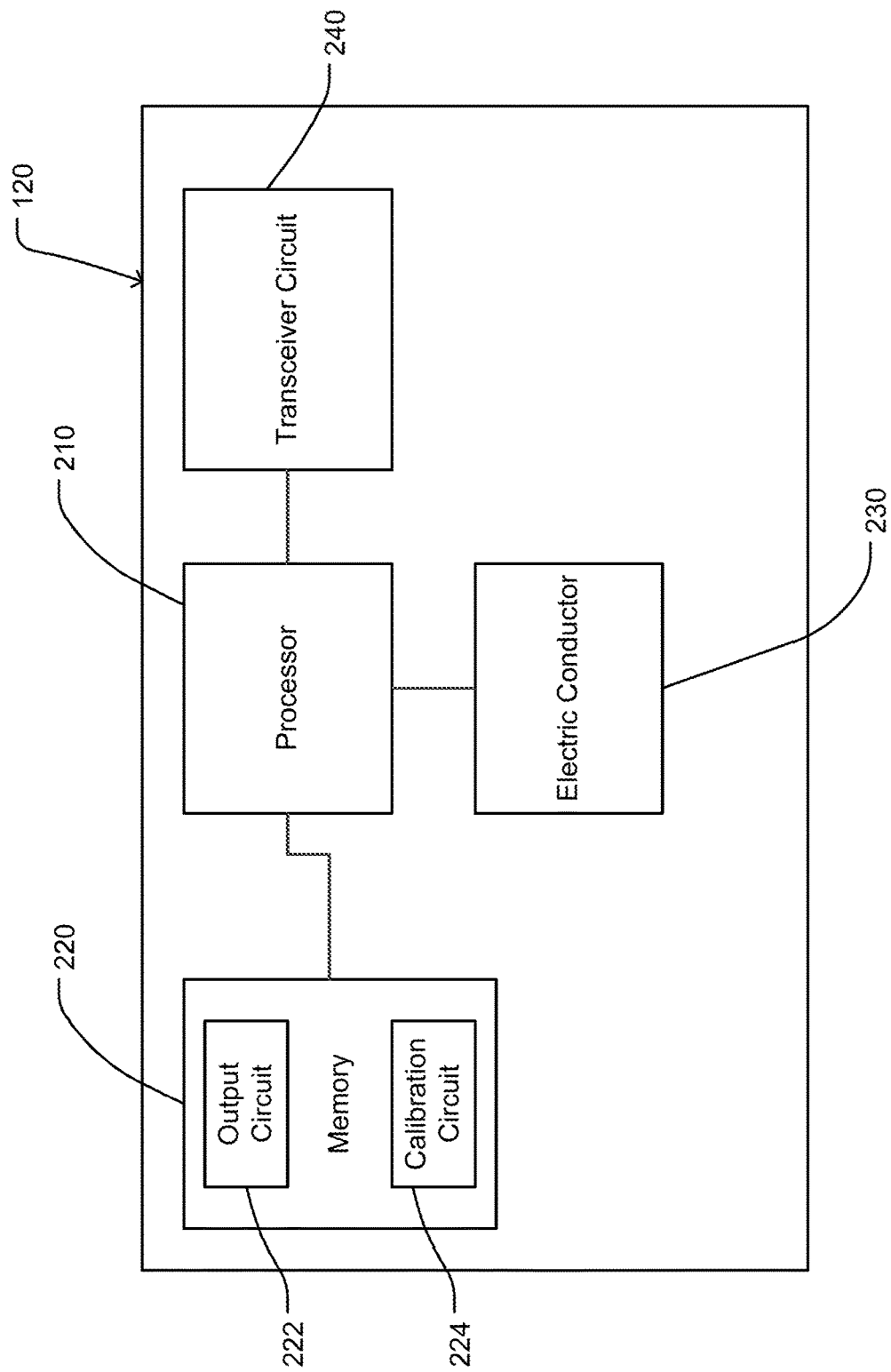
FIG. 3C is a block diagram of an exemplary embodiment of a diagnostic system including a sensor device according to the inventive concepts disclosed herein.

Referring now to FIG. 3C, an exemplary embodiment of the sensor device 120 is shown according to the inventive concepts disclosed herein. The sensor device 120 can include a processor 210, a memory 220, an electric conductor 230, and a transceiver circuit 240. The processor 210 may be implemented as a specific purpose processor, an application specific integrated circuit (ASIC), one or more field programmable gate arrays (FPGAs), a group of processing components, or other suitable electronic processing components. The memory 220 is one or more devices (e.g., RAM, ROM, flash memory, hard disk storage) for storing data and computer code for completing and facilitating the various user or client processes, layers, and modules described in the present disclosure. The memory 220 may be or include volatile memory or non-volatile memory and may include database components, object code components, script components, or any other type of information structure for supporting the various activities and information structures of the inventive concepts disclosed herein. The memory 220 is communicably connected to the processor 210 and includes computer code or instruction modules for executing one or more processes described herein. The processor 210 (or an electrical signal detection device coupled to the processor 210 and the electric conductor 230) may receive an electrical signal from the electric conductor 230, such as an electrical signal indicating a load applied to the electric conductor 230 or whether the electric conductor 230 has undergone failure (or the absence of an electrical signal from the electric conductor 230).

The memory 220 includes various circuits, software engines, and/or modules that cause the processor 210 to execute the systems and methods described herein. The memory 220 can include an output circuit 222 configured to cause the sensor device to generate an output signal indicating failure of the electric conductor 230 in response to a load that is greater than a load threshold. The memory 220 may include a calibration circuit 224 configured to process an electric signal received from the electric conductor 230 and provide a corresponding value for a load applied to the electric conductor 230. In some embodiments, the calibration circuit 224 stores a load threshold for the electric conductor 230, such that if the calibration circuit 224 an indication that the electric conductor 230 has undergone mechanical failure in response to an applied load, the calibration circuit 224 can output a measure of load corresponding to the load threshold. In some embodiments, the calibration circuit stores a mapping of properties of electrical signals received from the electric conductor 230 to a measure of load or a calibration function for converting the properties to a measure of load, such that the calibration circuit 224 can receive the electrical signal from the electric conductor 230, process the electrical signal (e.g., process the electrical signal to identify a property such as voltage), retrieve a corresponding measure of load or execute the calibration function to obtain the measure of load, and output the measure of load.

The output circuit 222 may be configured to encode information regarding the applied load in the output signal. For example, the output circuit may receive the electrical signal from the electric conductor 230, retrieve the corresponding load from the calibration circuit 224 or execute a calibration function stored in the calibration circuit to determine the corresponding load, and modulate the output signal to encode the corresponding load (e.g., modulate current, voltage, phase, frequency).

As shown in FIG. 3C, the sensor device 120 includes the transceiver circuit 240. The processor 210 can be configured to cause the transceiver circuit 240 to output the output signal (e.g., output the output signal to indicate the applied load, a measure of the applied load, an output signal encoded with information regarding the applied load). In some embodiments, the sensor device 120 includes transmission electronics (e.g., a transmitter device) separate from receiver electronics (e.g., a receiver device), or only includes a transmitter device. In some embodiments, the transceiver circuit 240 is configured for wireless communication (e.g., the transceiver circuit 240 can be configured to output the output signal as a wireless electromagnetic signal for reception by an end device, such as a diagnostic tool). The transceiver circuit 240 may be configured to output the output signal at a frequency or range of frequencies selected so that the output signal passes through the body 110 in which the sensor device 120 is embedded (e.g., the body 110 or the material thereof does not interfere with the output signal). In some embodiments, the transceiver circuit 240 (or a separate wired connection to the sensor device 120) is configured to be communicatively coupled by a wired connection to other electronics of the airborne platform 100, such as by being communicatively coupled to the aircraft control center 10 (e.g., via an electronic bus of the airborne platform 100).

Figure 4:
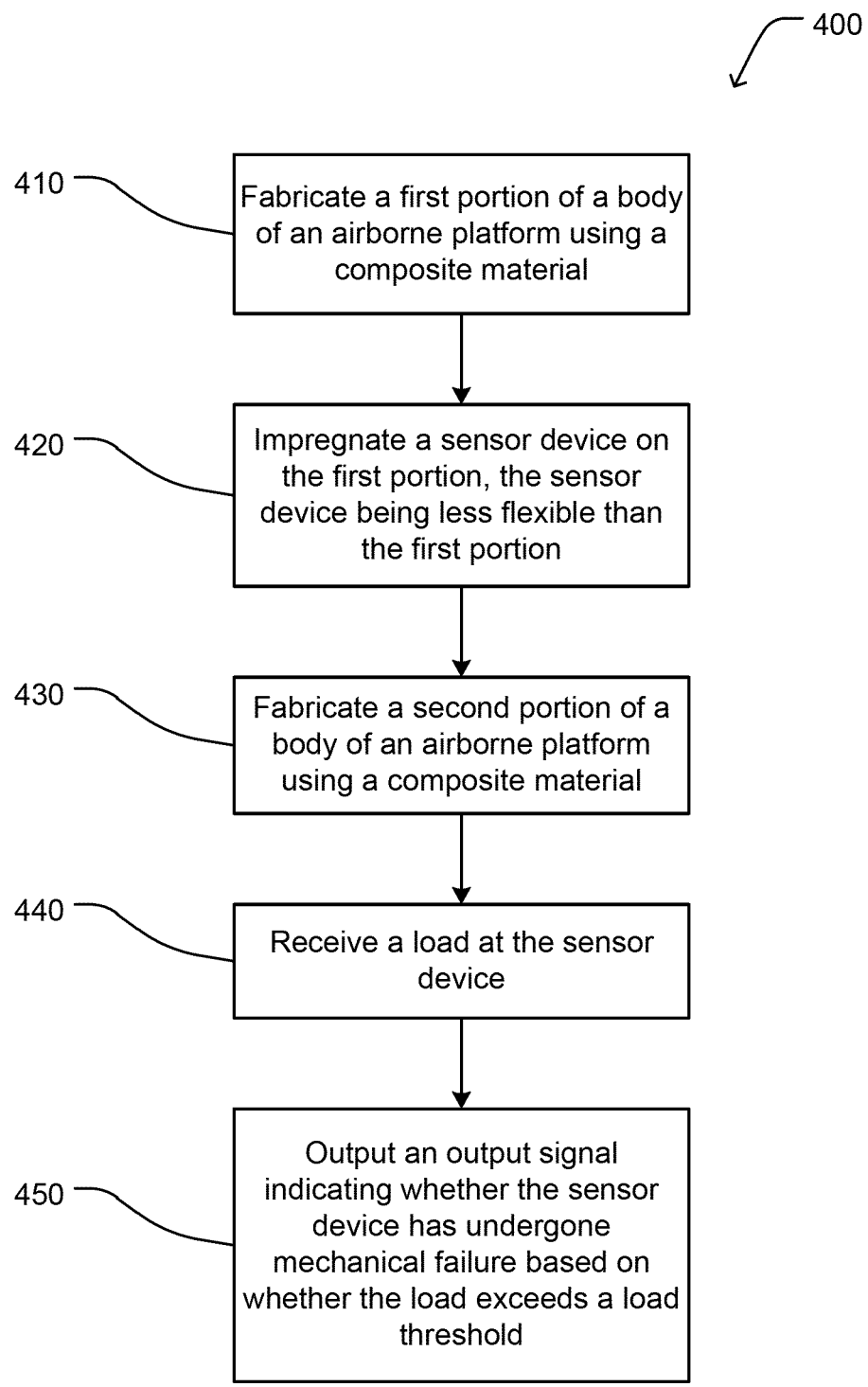
FIG. 4 is a diagram of an exemplary embodiment of a method of fabricating and operating a sensor device according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the airborne platform 100, the sensor device 120, and/or components thereof. The method 400 (or steps or groups of steps therein) may be performed by various actors, including design or manufacturing technicians and engineers, diagnostic technicians and engineers, and pilots or other aircraft personnel.

A step (410) may include fabricating a first portion of a body of an airborne platform using a composite material. The composite material may be fiberglass or other fiber material (e.g., carbon fiber, boron fiber). The first portion may be fabricated in layers. The first portion may be fabricated in a pattern that leaves an opening (e.g., gap, hollow, channel) in which a sensor device may be embedded.

A step (420) may include impregnating (e.g., depositing, layering, embedding) a sensor device on the first portion, the sensor device being less flexible than the first portion. The sensor device may be previously assembled or fabricated, and then laid or embedded on the first portion (e.g., in the opening). The sensor device may be assembled in parts as it is embedded on the first portion. The sensor device may be embedded at a specific location in the body, such as a location at which a maximum stress on the body is expected. The sensor device may include an electric conductor (e.g., an aluminum fuse or other material fuse) that undergoes mechanical failure in response to receiving a load that is greater than a load threshold.

In some embodiments, impregnating the sensor device include orienting the sensor device relative to the first portion based on a desired response of the sensor device to a load applied to the sensor device. For example, given an expected range of loads to be received a particular location within the body, the sensor device can be oriented such that the sensor device can detect a greater (or maximum) portion of the expected range of loads, while maintaining the load threshold at which the sensor device undergoes mechanical failure below a load threshold or failure threshold of the body.

A step (430) may include fabricating a second portion of the body using a composite material. The second portion may be overlaid on the first portion and the sensor device. The second portion may be bonded to the first portion, or otherwise fabricated in a manner such that having the sensor device embedded in the body does not significantly reduce structural integrity of the body.

A step (440) may include receiving a load at the sensor device. For example, during a diagnostic operation or during normal operation of the airborne platform (e.g., takeoff, landing, flight), pressure differentials across the body in which the sensor device is embedded, or vibrations of the airborne platform, may cause a load to be applied to the body. As the load is transmitted through the body, the load may be applied to the sensor device (e.g., the load may cause the sensor device to compress or elongate).

A step (450) may include outputting an output signal indicating whether the sensor device (or the electric conductor thereof) has undergone mechanical failure based on whether the load exceeds a load threshold. For example, if the load causes the electric conductor to break or otherwise discontinue conducting electricity, the sensor device can detect this failure and in response, output the output signal. Based on the output signal, the load causing the failure can be determined (e.g., the load causing the failure is greater than the load threshold). In some embodiments, the sensor device outputs a first signal for loads less than or equal to the load threshold, and a second signal (having different electrical properties from the first signal) for loads greater than the load threshold. In some embodiments, the sensor device only outputs an output signal in response to determining failure (e.g., in response to detecting a load greater than the load threshold). In some embodiments, the sensor device only outputs an output signal if the load is less than or equal to the load threshold (e.g., loads greater than the load threshold cause the sensor device to discontinue outputting the output signal).

In some embodiments, the method may further include connecting the sensor device to an output cable. For example, an electrical cable that receives the output signal from the sensor device may be embedded in at least part of the body and communicatively coupled to the sensor device. The electrical cable may be communicatively coupled to an electronic bus of the airborne platform, allowing for the output signal from the sensor device to be received via the electronic bus (e.g., received in a control center of the airborne platform). In some embodiments, the sensor device includes a wireless transmitter and/or wireless receiver, such that the sensor device can wirelessly transmit the output signal to a receiving device.

In some embodiments, the method may further include impregnating a second sensor device in the body. The second sensor device includes a second electric conductor. The second electric conductor includes a third material having a third flexibility that is less than the first flexibility. In some embodiments, impregnating the second sensor device includes orienting the second sensor device such that a second load threshold at which the second sensor device undergoes mechanical failure is greater than the load threshold of the body.

In some embodiments, at least one of the first portion, the sensor device, or the second portion is fabricated using additive layer deposition. For example, an additive layer device (e.g., a three-dimensional printer) can deposit layers that make up the first layer, layers that make up the sensor device, and or layers that make up the second portion. In some embodiments, such as when the sensor device is oriented at an angle, the additive layer device can deposit a first plurality of layers that make up the first portion, a second plurality of layers that make up parts of the first portion and parts of the sensor device, a third plurality of layers that make up parts of the sensor device and parts of the second portion, and a fourth plurality of layers that make up parts of the second portion.

As will be appreciated from the above, systems and methods for conductive aircraft sensors according to embodiments of the inventive concepts disclosed herein may improve operation of airborne platforms, such as by providing increased precision, accuracy, and reliability in measurements of loads applied to the airborne platform, both during diagnostic events and during real-time operation of the airborne platform.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An airborne platform, comprising:
a body comprising a first portion and a second portion, the first portion and the second portion made from a first material having a first flexibility;
a first sensor device embedded within the body and impregnated on the first portion, the first sensor device comprising a first electric conductor, the first electric conductor comprising a second material having a second flexibility that is less than the first flexibility, the first sensor device configured to output an output signal indicating whether the first sensor device has undergone mechanical failure in response to a load applied to the first sensor device that is greater than a first load threshold; and
a second sensor device impregnated in the body, the second sensor device comprising a second electric conductor comprising a third material having a third flexibility that is less than the first flexibility, the second sensor device oriented at an angle relative to the first portion and the first sensor device such that a second load threshold at which the second sensor device undergoes mechanical failure is greater than the first load threshold at which the first sensor device undergoes mechanical failure.

2. The airborne platform of claim 1, wherein the first load threshold is defined based on at least one of the second material and an orientation of the first sensor device relative to the body.

3. The airborne platform of claim 1, wherein the first sensor device is configured to be in a first state when exposed to the load being less than or equal to the first load threshold, and a second state when exposed to the load being greater than the first load threshold.

4. The airborne platform of claim 3, wherein the first sensor device is configured to undergo an irreversible transition from the first state to the second state in response to the load applied to the first sensor device being greater than the load threshold.

5. The airborne platform of claim 4, wherein in the first state, the first sensor device is configured to output the output signal, and in the second state, the first sensor device is configured to not output the output signal.

6. The airborne platform of claim 3, wherein the first sensor device is configured to undergo a number of reversible transition cycles between the first state and the second state, the number of reversible transition cycles based on at least one of a duration of the load or an amount by which the load exceeds the first load threshold.

7. The airborne platform of claim 1, wherein the load is a first load, and the output signal is proportional to a second load applied to the body where the first sensor device is located within the body.

8. The airborne platform of claim 1, wherein the first material is a composite material.

9. The airborne platform of claim 1, wherein the first sensor device is at least one of positioned or oriented such that the first load threshold is less than a failure threshold at which the body breaks.

10. A method, comprising:
fabricating a first portion of a body of an airborne platform using a composite material, the composite material having a first flexibility;
impregnating a first sensor device on the first portion, the first sensor device comprising a first electric conductor comprising a second material having a second flexibility that is less than the first flexibility;
impregnating a second sensor device in the body, the second sensor device comprising a second electric conductor comprising a third material having a third flexibility that is less than the first flexibility;
orienting the second sensor device at an angle relative to the first portion and the first sensor device such that a second load threshold at which the second sensor device undergoes mechanical failure is greater than a first load threshold at which the first sensor device undergoes mechanical failure;
fabricating a second portion of the body of the airborne platform on the first portion, the first sensor device, and the second sensor device using the composite material such that the first sensor device and the second sensor device are located inside the body and the second sensor device is angled relative to the second portion;
receiving a load at the first sensor device; and
outputting an output signal indicating whether the first sensor device has undergone mechanical failure based on whether the received load is greater than the first load threshold.

11. The method of claim 10, wherein impregnating the first sensor device comprises orienting the first sensor device relative to the first portion based on a desired response to the load of the first sensor device.

12. The method of claim 10, wherein at least one of the first portion, the first sensor device, the second sensor device, or the second portion is fabricated using additive layer deposition.

13. The method of claim 10, wherein impregnating the first sensor device comprises orienting the first sensor device relative to the first portion such that the load threshold is less than a failure threshold at which the body breaks.

14. The method of claim 10, wherein the output signal is proportional to a load applied to the body where the first sensor device is located within the body.

15. A sensor system, comprising:
a first sensor device embedded within a body of an airborne platform and impregnated on a first portion of the body, the first sensor device comprising a first electric conductor, the first electric conductor comprising a first material having a first flexibility that is less than a second flexibility of the body, the first sensor device configured to output an output signal indicating whether the first sensor device has undergone mechanical failure in response to a load applied to the first sensor device that is greater than a first load threshold, the first material selected based on an expected load applied to the first sensor device, the body having a second flexibility that is greater than the first flexibility; and
a second sensor device impregnated in the body, the second sensor device comprising a second electric conductor comprising a third material having a third flexibility that is less than the first flexibility, the second sensor device oriented at an angle relative to the first portion and the first sensor device such that a second load threshold at which the second sensor device undergoes mechanical failure is greater than the first load threshold at which the first sensor device undergoes mechanical failure.

16. The sensor system of claim 15, wherein the first sensor device is further configured to be in a first state when exposed to the load being less than or equal to the load threshold, and a second state when exposed to a load greater than the load threshold.

17. The sensor system of claim 16, wherein in the first state, the first sensor device is configured to output the output signal, and in the second state, the first sensor device is configured to not output the output signal.

18. The sensor system of claim 16, wherein the first sensor device is further configured to undergo a number of reversible transition cycles between the first state and the second state, the number of reversible transition cycles based on at least one of a duration of the load or an amount by which the load exceeds the first load threshold.

19. The sensor system of claim 15, wherein the first sensor device is further configured to undergo a visually detectable transition when the applied load is greater than the first load threshold.

* * * * *